Aug. 27, 1946.  P. GARDNER ET AL  2,406,677
APPARATUS FOR MAKING SPIRAL WOUND TUBING
Filed Feb. 10, 1943  10 Sheets-Sheet 7

Patented Aug. 27, 1946

2,406,677

UNITED STATES PATENT OFFICE 2,406,677

APPARATUS FOR MAKING SPIRAL WOUND TUBING

Percy Gardner, East Orange, N. J., and Ralph Kagan, Brooklyn, N. Y., assignors to Spiral Bagging Machine Corporation, New York, N. Y., a corporation of New York Application February 10, 1943, Serial No. 475,372

21 Claims. (Cl. 112—63)

This invention relates to a new and useful improvement in apparatus for making spiral wound tubing.

A main object of the invention is to produce at high speed and in a continuous manner, from textile sheeting, a sewed tube having bias flat seams, and winding it up flat on a roll as it is formed, with a minimum of effort and attention on the part of the operator.

Another object is to enable the operator quickly to change the character of the seam, as in the degree of overlap, if an overlapped seam is being made.

A further object is to enable the operator to adjust the mandrel over which the material extends in a spiral path so that its perimeter may be adjusted to the amount of seam overlap and to the width of the sheeting being made into tubes.

A still further object is to advance the material on to and around the mandrel in a spiral path by the use of perimetrical contact feeding devices the speed of which is synchronized with that of the sewing machine.

Yet another object is to employ a sewing machine without a feed dog whereby the entire feed of the material is obtained from the perimetrical feed devices.

Another object is to flatten out the material as it leaves the mandrel and wind it up on a roll on a receiver which is being turned in synchronism with the angular motion of the tube while at the same time keeping the flat tubular material being wound up under regulated tension.

Another is to provide in some cases means whereby the material as it passes over the mandrel may be automatically kept under regulated tension.

Further and more specific objects, features, and advantages will be more clearly apparent from a consideration of the following specification, especially when taken in connection with the accompanying drawings which form part thereof.

Briefly and generally considered, the machine as a whole includes a mandrel over which a sheet of textile material is passed in a spiral path; a sewing device to sew the adjacent edges of the first two turns together into a flat seam; a series of feed rollers disposed in association with each turn on the mandrel to pull the material evenly over and around the mandrel in this path as well as to assist in feeding the material past the sewing point since the sewing machine may not be provided with a feed dog; a flattening device at the end of the mandrel to give the formed tube a preliminary flattening; a receiver for the formed flattened tube, which receiver is generally in the form of a spider or frame support which can be either manually or otherwise turned on an axis at a rate corresponding to that at which the tube turns around the mandrel; a wind-up roller on the support which is connected to driving means so that the linear speed of it is the same as the linear speed of the sheet feed rollers on the mandrel; a series of tensioning rollers on the support which are adjustable and positively driven at the same linear speed as the speed at which the material leaves the mandrel; and a driving connection between the wind-up rollers on the support, the tensioning rollers thereon, and the feed roller driving means on the mandrel; and a synchronization between the feed speed of the feed rollers on the mandrel and the action of the sewing machine needle.

These various mechanisms will be briefly and separately described as follows:

1. *Mandrel.*—Preferably is made of longitudinal rods connected to an adjusting device so that the cross sectional perimeter may be adjusted to govern the relation of adjacent edges of at least the first two turns of the sheeting, as well as to provide larger or smaller tubes as various widths of sheeting may be employed.

2. *Sewing device.*—This is preferably a special machine in which the sheeting in any width may be run past the sewing point and may be of a form using no feed dog. The power from the upper needle operating portion to the lower looper or shuttle operating portion is transferred laterally instead of straight down as usual since the usual supporting column is eliminated. By this lateral transmission of power, the transmitting elements skirt one edge of the sheeting to get underneath the same so that any width of sheeting may be run through the machine. Whether or not the sewing machine has no feed dog, the movement of the goods past the sewing point is effected by means of the following, 3. *Feeding rollers* of which there are a series extending along the top of the mandrel and driven by a motor which also drives the sewing mechanism. Each turn of the sheet is engaged by these rollers and the sewed seam just beyond the sewing point is engaged by a set of rollers to pull the material past the sewing point in synchronism with the operation of the needle. All the rollers of the feed are thus synchronously driven.

4. *Tube flattening device.*—This is disposed on the end of the mandrel and is freely rotatable to lie within the tube and give it a preliminary flattening out before it is wound up on the following device.

5. *Tube wind-up receiver* comprises a spider mounted on trunnions to be freely rotatable by hand or mechanically as may be desired. The axis of this rotation is in line with the axis of the tube leaving the mandrel. On the spider or support is a roller on which the tube is to be wound up after it is flattened. This roller is driven at the same linear speed as that of the mandrel feed rollers. In order to permit the flattened tube to be wound up smoothly and tightly on this wind-up roller it is previously run in connection with the following devices, 6. *Tensioning rollers in wind-up*, which comprises at least two positively driven rollers on the support over which the flat tube is passed before it is wound up. These tensioning rollers can be relatively adjusted to regulate the tension to which the tube is subjected and are driven at a linear speed equal to that of the mandrel feed rollers.

7. *The common drive* from the main motor which not only drives the sewing machine, the mandrel feed rollers, but also is connected to the wind-up rollers and the tensioning rollers on the receiver support.

It will be readily apparent from the above and the following description, when taken in the light of the detailed drawings, that we have provided a simple means for running textile sheeting in a definite spiral path, which sheeting may be adjusted in a spiral manner with adjacent edges of at least some of the turns related to form a flat seam, and then sewing the adjacent edges together to form a flat seam. This means also includes the step of adjusting the form or mandrel, which determines the spiral path, to determine its perimetrical distance to permit for different widths of material, larger or smaller tubes, and varying degrees of overlap in seams when overlapped seams are being employed. The means also includes the step of giving the tube a preliminary flattening out and then winding it up on a support which is turning at the same rate as the tube and at the same time keeping the wound-up material under proper regulated tension to get a smooth tight wind to the roll.

The apparatus includes a mandrel adjustable to perimetrical length for the reasons mentioned, a pull away operation between the feed rollers on the mandrel and the sewing machine which are operated in synchronism. It also provides means when in some instances it may be desired to permit one part of the mandrel to be automatically positioned by gravity to maintain a determined degree of tension on the material as it passes around the mandrel. In passing over the mandrel, the first two turns at least are relatively disposed for a flat seam and in the form shown in the drawings are slightly overlapped.

The various features of the apparatus above generally set forth are presented in combinations in the attached claims.

This application is intended to be a continuation in part of our co-pending application Serial Number 363,430, filed October 30, 1940, entitled "Method and apparatus for making spiral wound tubing," in the name of Percy Gardner and Ralph Kagan, the herein named applicants. In the specification and the claims the word "textile" is used since it is the material most generally employed, but it is to be understood that if a single sheet of any material can be spirally passed over a stationary mandrel and be sewn and handled as herein described and claimed, it is intended to include any such material and not limit the use of the machine merely to textile material.

A preferred form which the invention may assume is illustrated in the drawings which form part of the specification and in which.

The apparatus thus broadly and generally set forth and described is shown in the accompanying drawings in a machine which represents the present preferred form achieved to incorporate the novel features thereof, but it is to be clearly understood that the particular form of machine shown is only one of the forms which may be developed to embody the broad general ideas included in the scope of the apparatus claims.

As shown in the drawings, the structure illustrated includes a frame work of metal which is supported by a series of pedestals such as 30, 31, 32, 40, 41, and 42. Supported on these pedestals is an I-beam 33 above which an L-beam 34 is disposed and supported thereabove by means of several angle bars 35 and 36. The pedestals 32 are connected by a cross bar 37 which supports the end of the L-beam 34.

Supported by the pedestals and the I-beam at the inlet end of the machine is a frame 38 to which is connected a feed table 39 over which the material passes in its advance to the sewing point. On this table, although not shown, there may be disposed any well known form of means to automatically guide the edges of the sheet such as the well known photo-electric cell units to keep the edge of the material travelling in a definite line.

Figures 6, 14, 15:
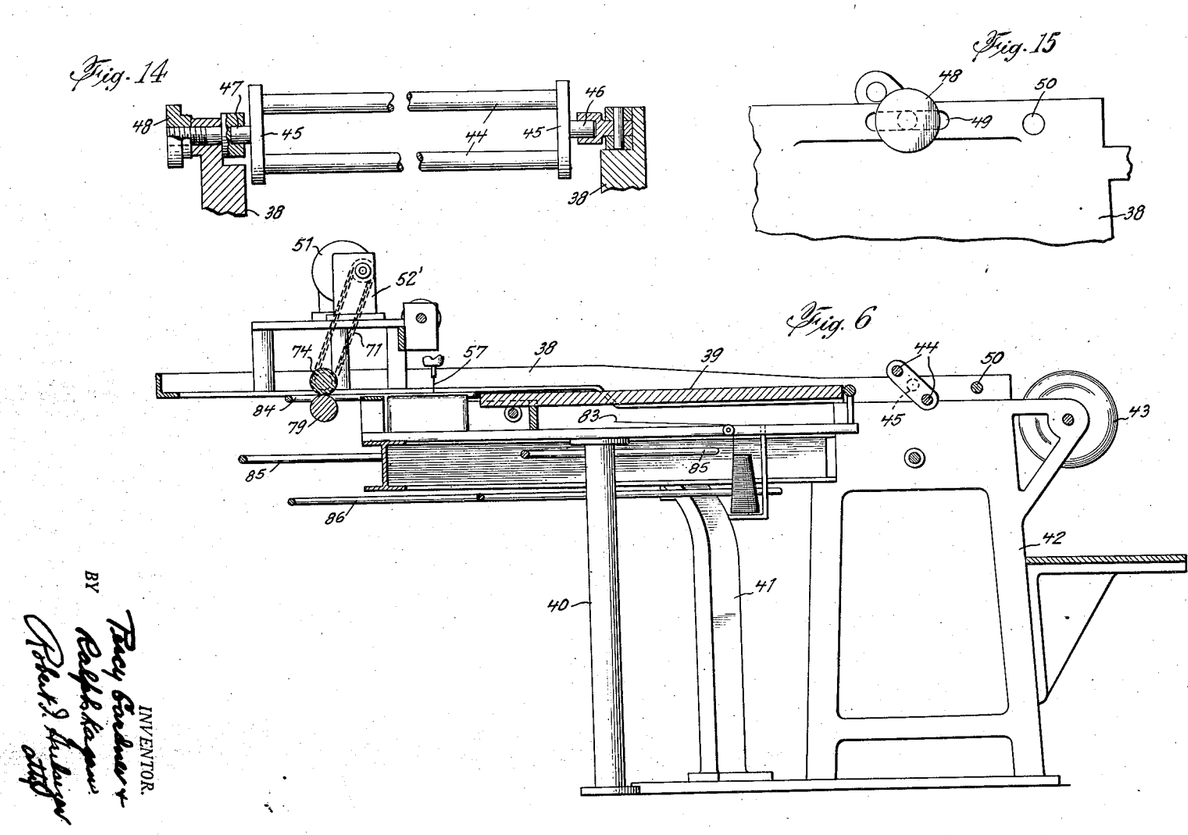
Fig. 6 is a vertical section taken through the machine on the line 6—6 of Fig. 2.
Fig. 14 is a vertical section taken on the line 14—14 of Fig. 2 and showing the material tensioning rods.
Fig. 15 is a partial side elevation of these tensioning rods and the means for adjusting their position relative to the material.

Referring to Fig. 6, it will be seen that the sheet material is disposed on a roll 43 supported by a bracket from the pedestal frame 42 and passes over the top of frame 38 and table 39 through tensioning bars 44 and 50. The bars 44 are mounted in end plates 45 which are rotatably supported on stub shafts 46 and 47 nested in the frame 38. The stub shaft 47 extends laterally as shown in Figs. 14 and 15 and is adjustable in a slot 49 in the frame 38 by means of a thumb screw device 48 so that the position of the bars 44 relative to the material sheet may be adjusted to vary the tension exerted upon the material by the bars. This tension regulation is necessary to exert on the material both at the beginning of its travel and at the end because in so regulating the tension to which it is subjected, the regularity and evenness of its travel through the machine is more effectively insured.

Figure 9:
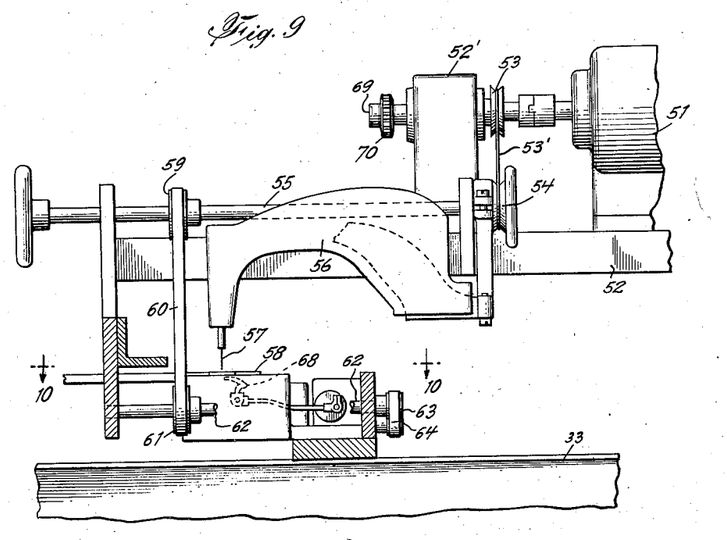
Fig. 9 is a vertical section taken on the line 9—9 of Fig. 2.

Referring particularly to Fig. 9 there is illustrated the means for sewing the adjacent edges of preferably the first two turns of the spirally disposed material together. This means includes a motor 51 mounted with the rest of this unit on a frame member 52 suitably supported from the other frame members. A pulley 53 on the motor shaft is connected by a belt 53' to a pulley 54 which is connected in the usual manner to the upper driving mechanism of the sewing machine to drive the needle 57. This mechanism is supported in the usual upper arm or head 56 of the machine. The pulley 54 is on a shaft 55 having a pulley 59 connected by belt 60 to a pulley 61 on a lower shaft 62. At its other end the shaft 62 has a pulley 63 connected by a belt 64 to a pulley 65 to a shaft 66. This shaft 66 is connected in a usual manner by a pitman 67 to a looper device 68. This looper may well be the usual shuttle device generally disposed below the bed plate 58 of the sewing machine. By reason of the arrangement shown it will be apparent that the drive of the mechanism is transmitted from the motor 51 to the needle more or less in the usual manner but that the lower mechanism to be driven is driven by a series of power transmitting elements which transfer this power around and to the side of the material passing through the machine and down to the lower portion of the sewing apparatus so as not to interfere with the free passage of the material through the machine no matter how wide the material is.

Figure 1:
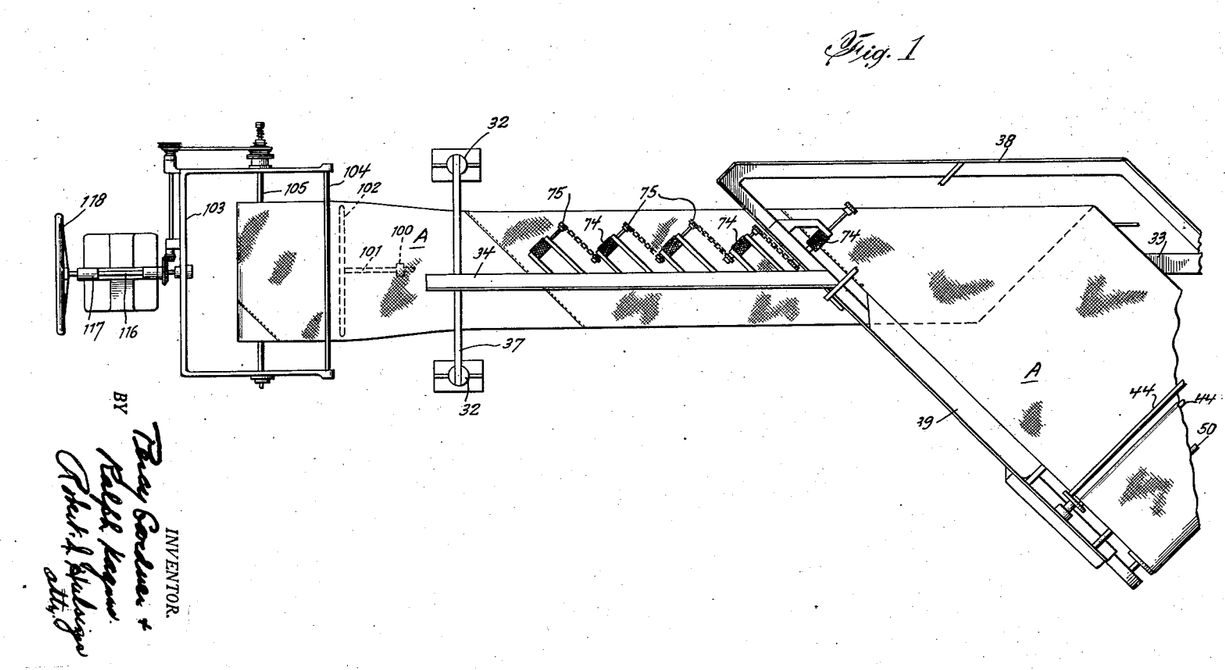
Fig. 1 is a plan view of the entire machine with portions broken away and showing the material passing therethrough.
Figure 2:
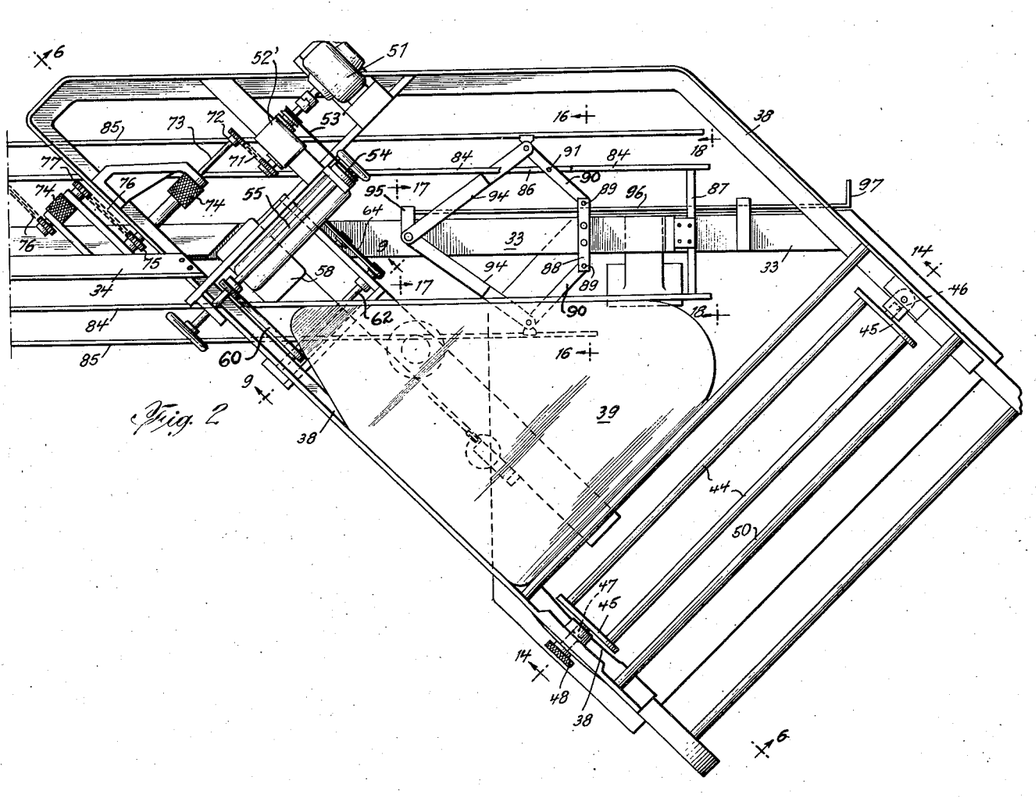
Figs. 2 and 3, placed together, form an enlarged plan view of the entire machine with the material removed more clearly to illustrate the various mechanisms.
Figure 3:
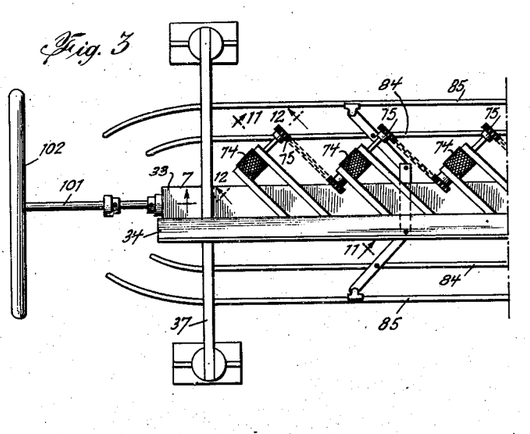
Figure 4:
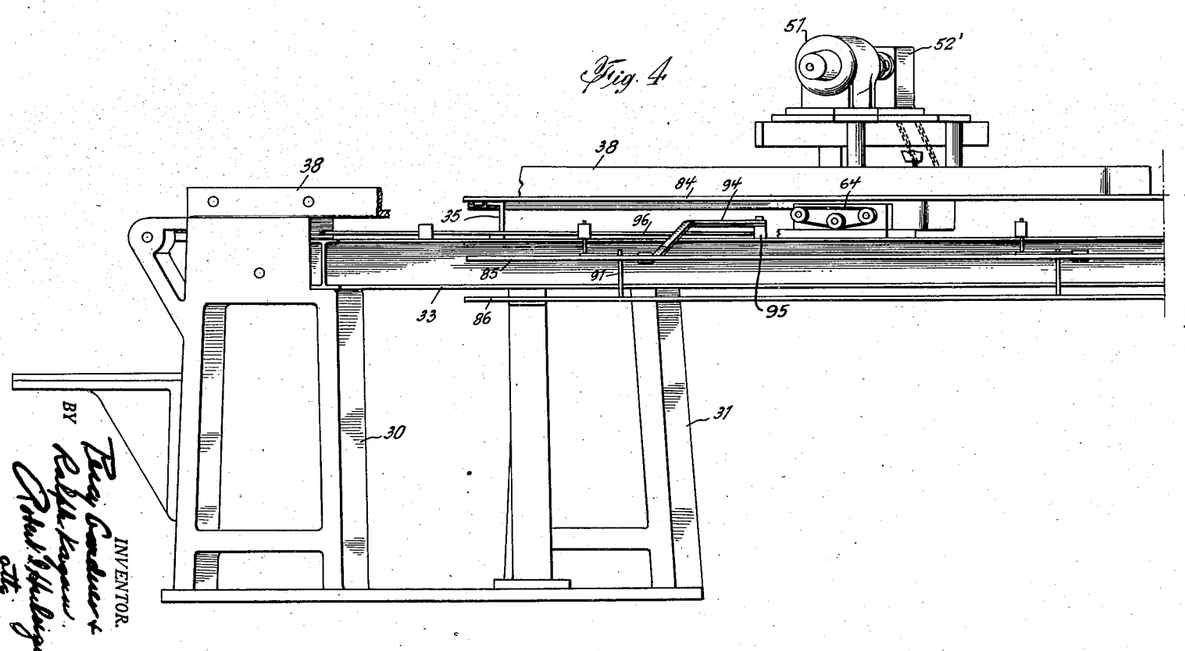
Figs. 4 and 5, when placed together, form a side elevation of the entire machine.
Figure 5:
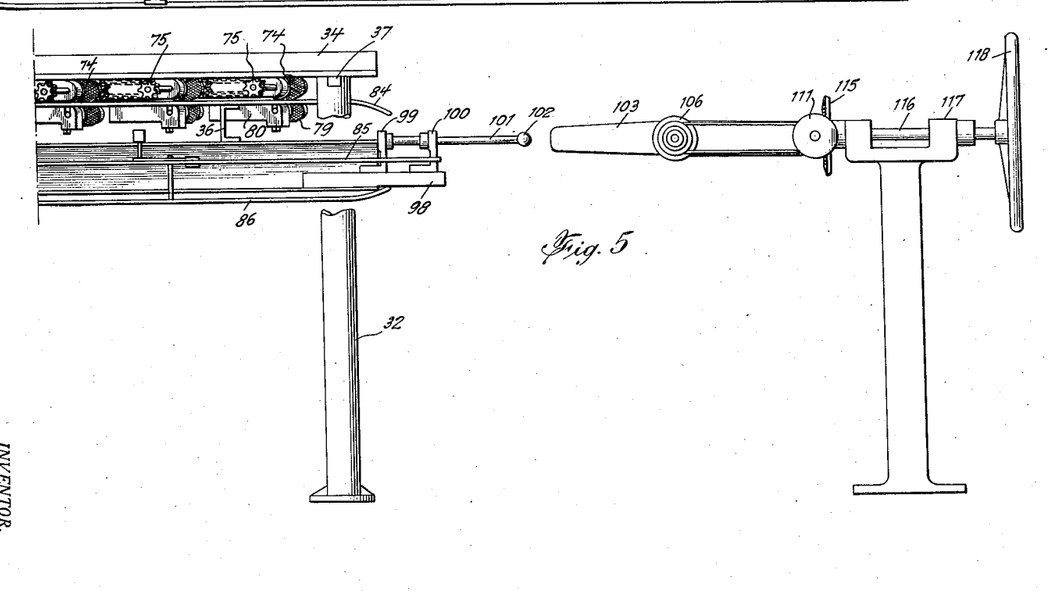
Figure 10:
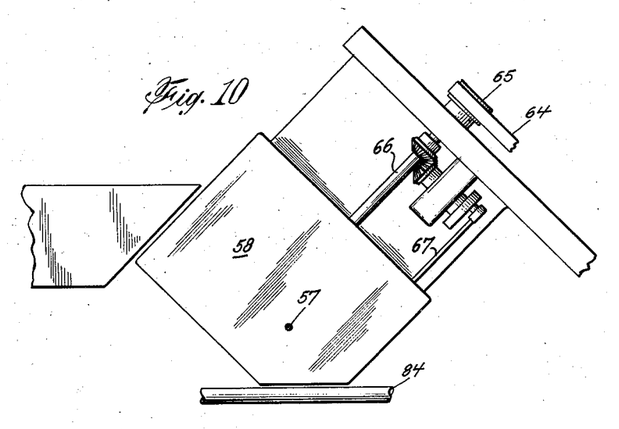
Fig. 10 is a horizontal section taken on the line 10—10 of Fig. 9.

Also referring to Figs. 2, 9, and 10, it will be seen that the motor shaft is connected to a speed reduction unit 52' having a gear 70 on the shaft 69 thereof. This gear is connected by a chain 71 to a gear 72 on a shaft 73 the other end of which has a feed roller 74 thereon. The other end of the shaft 73 has a gear 75 thereon which is connected by a chain 76 to a gear 77 on another shaft corresponding to shaft 73 but spaced therefrom. Roller 74 on this shaft corresponds to roller 74 on shaft 73. This transmission of power from the motor through chains and gears to the series of feed rolls 74 is clearly shown in Figs. 1, 2, and 3. The drive of these rollers is so regulated and calculated that they tend to pull the material through the machine at a rate synchronized with the rate at which the sewing machine would ordinarily feed the material through the device. The sewing machine is ordinarily one in which the lower feed dog is omitted so that the feed of the material through the machine is entirely dependent upon the pull of the rollers 74.

It will be observed from Fig. 2 that the first roller 74 is disposed beyond the sewing point to pull the material past this point and this pull, with the regulated tension on the material as it is fed into the machine insures that the material will pass the sewing point at the desired linear speed in synchronism with the speed of the needle.

Figure 11:
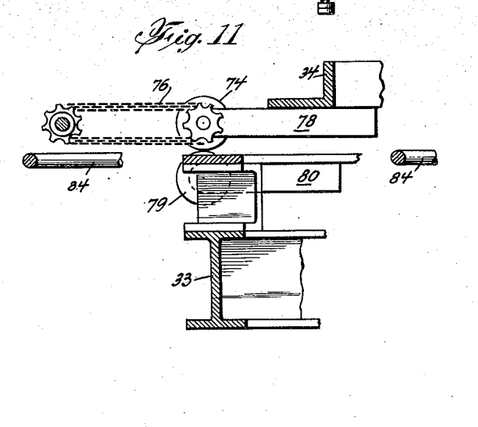
Fig. 11 is a vertical section taken on the line 11—11 of Fig. 3.
Figure 12:
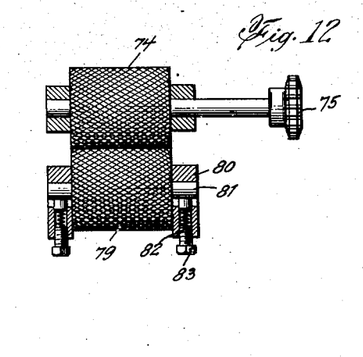
Fig. 12 is a vertical section taken on the line 12—12 of Fig. 3.
Figure 13:
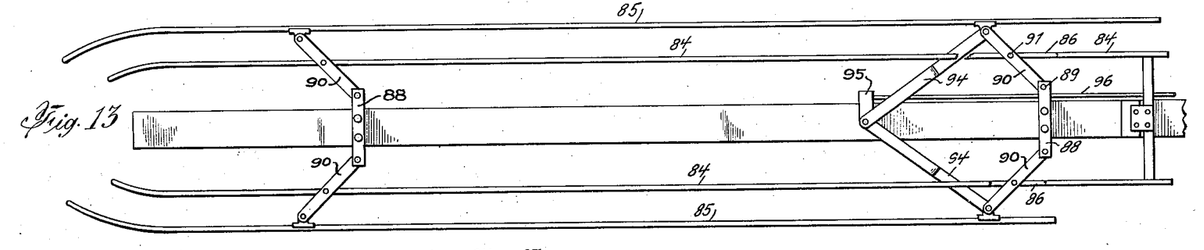
Fig. 13 is a partial plan view of the mandrel itself and the means for adjusting its perimeter.
Figure 16:
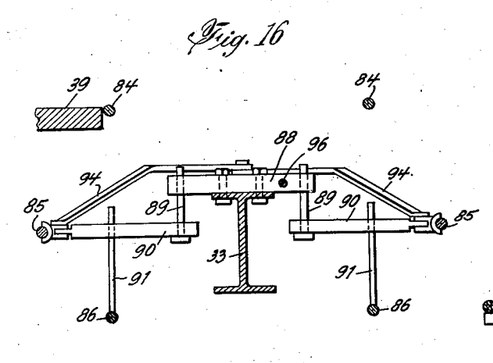
Fig. 16 is a vertical section taken on the line 16—16 of Fig. 2.
Figure 17:
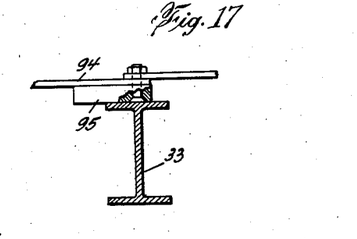
Fig. 17 is a vertical section taken on the line 17—17 of Fig. 2.

As shown in Figs. 11 and 12, the upper feed rollers 74 are supported from the frame members 34 by means of bars 78 and beneath each roller 74 there is disposed an idle roller 79 which is supported on a frame member 80. This roller 79 has stub shafts 81 which are engaged by springs 82 the compression of which is regulated by set screws 83 to permit the rollers 79 to yield as required.

Figure 18:
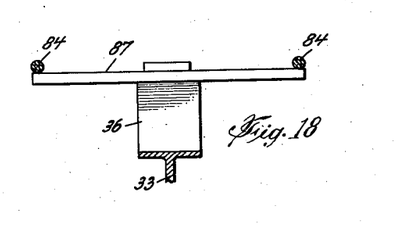
Fig. 18 is a vertical section taken on the line 18—18 of Fig. 2.

In the feed of the material through the machine it is guided over a mandrel which includes a series of mandrel bars of which bars 84 are the topmost bars, bars 85 are the median bars, and bars 86 are the lowermost bars. As shown in Figs. 2 and 18 the topmost bars 84 are connected by cross elements 87 mounted on angle bars 36 in a permanent position. The median bars 85 are supported from the I-beam 33 by means of a cross bar 88 to which are connected pivoted rods 89 at the lower ends of which are connected rods 90 at the outer ends of which the bars 85 are connected in any suitable manner.

Figure 19:
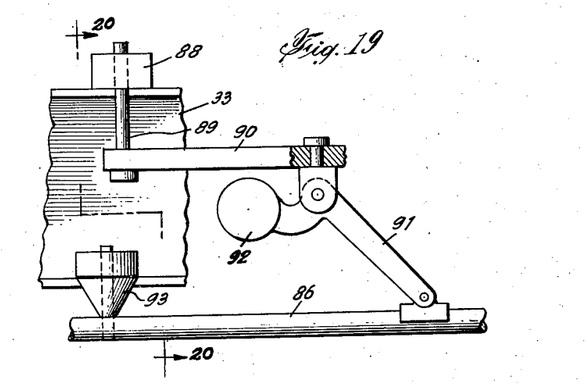
Fig. 19 is an enlarged side elevation of a portion of a modified form of mandrel showing a gravity-operated rod.
Figure 20:
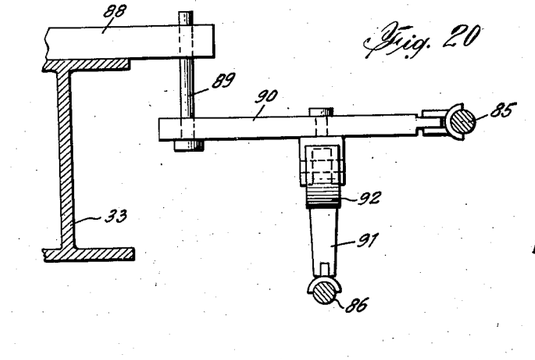
Fig. 20 is a cross section taken on the line 20—20 of Fig. 19.

The lower bars 86 are supported from the other bars by means of dependent links 91 attached at their upper ends to the rods 90 by any suitable swivel joint as shown. At least one of these lower bars 86 is counterweighted by means of weight 92 connected to link 91 and adapted to control the outward advance of the bar 86 in relation to the counterbalancing weight 93 mounted on the bar 86 as shown particularly in Fig. 19. This construction is to cause the bar 86 to be moved outwardly at all times to keep the material under proper regulated tension regardless of the character an size of the tubular material.

In order to adjust the median bars 85 of the mandrel so that the perimeter of the mandrel may be adjusted at will these bars are mounted to be adjusted by means of links 94 the inner ends of which are connected to a slide block 95. This block may be positioned along the top of the I-beam 33 by means of a lever 96 to which is connected a handle 97. By moving the handle 97 forward or backward the position of the block 95 can be changed and consequently the position of the bars 85 and also the bars 86 can be changed to change the outside perimeter of the bars forming the mandrel.

The adjustment of the mandrel bars has been previously described as necessary to accommodate the various sizes of material sheets which are fed through the machine. It has also been shown that with a given size of sheet fed through the machine, by varying the size of the mandrel the degree of overlap of the adjacent turns and consequently the degree of overlap of the seams can be regulated. It is also true that when the width of the sheet material varies the size of the mandrel to get a definite amount of overlap of the adjacent edges must be regulated to that size of sheet.

It will thus be borne in mind that the material has been fed into the machine and guided to the sewing point at which point the first two adjacent edges are overlapped to a definite degree and sewed together. The material is at this point pulled through the machine by the first set of rollers 74 which are disposed just beyond the sewing point and constitute the only means to feed the material beyond this point since the sewing machine is ordinarily not provided with a lower feed dog. The material after being sewn is advanced across and around the mandrel in the spiral path by the successive series of feed rollers 74 which are resiliently related to the lower set of feed rollers by spring construction previously described. The feed action of all these rollers are synchronized with the feed of the needle so that the material at all times is fed forward at the same linear speed from the time it enters the machine until it leaves the mandrel.

It will be therefore observed that the material is fed through a spiral path with adjacent edges disposed in position to form a flat seam and that it is turning spirally at an angular rate of speed due to the action thereon of the feed rollers 74. As it leaves the mandrel it is of course still turning at this angular speed and has a definite forward linear speed. It is a purpose of this invention to take this tubular material as it leaves the mandrel and wind it up flat on a roll so that when thus wound up it can be available without further treatment for many uses. In order to do this it is necessary that it be received on a wind-up apparatus which is also rotating at the same angular speed as the speed of the material as it leaves the mandrel.

Figures 7, 8:
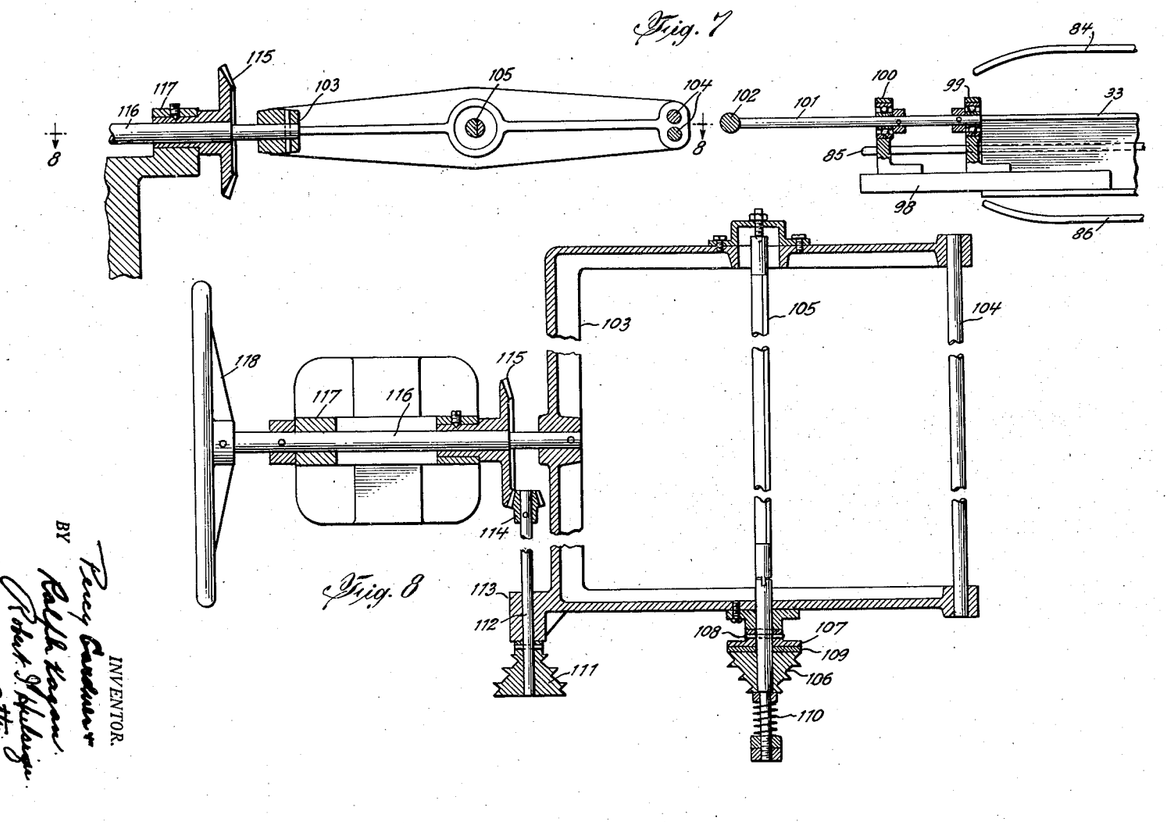
Fig. 7 is a vertical section taken on the line 7—7 of Fig. 3.
Fig. 8 is a horizontal section taken on the line 8—8 of Fig. 7.

To achieve this result therefore it will be necessary to refer to Figs. 7 and 8 which will show a preferred form of construction whereby this object may be achieved. In these figures it will be noted that a supporting bar 98 is connected to the end of the I-beam 33 and supports journal members 99 and 100 to support a rotating shaft 101 on the outer end of which is disposed a flattening bar 102 which is consequently freely rotatable with the shaft 101. As the material leaves the mandrel in tubular form it is passed about the flattening bar 102 which gives it a preliminary flattening operation.

The partly flattened material then passes on to a wind-up receiving element or device which in the preferred form is shown in Figs. 7 and 8. In this form of receiver device the material after leaving the flattening bar 102 passes between the idler rollers or bars 104 mounted on the adjacent end of a spider frame 103. This frame is provided with a wind-up shaft 105 on which the flattened tube is wound up. This shaft is driven by means of a slip clutch mechanism which includes a pulley 106, a clutch member 107 fastened to shaft 105 by means of pin 108 and another clutch disc 109, the pulley 106 being pressed against the clutch members by means of a spring member 110. The pulley 106 is operated by a belt (not shown) from a belt pulley 111 on a shaft 112 journalled in bracket 113 mounted on spider frame 103. The shaft 112 has a bevel gear 114 thereon meshing with a bevel gear 115 which is fixed to a bearing or journal mounted on a suitable pedestal.

The spider frame 103 is mounted on a shaft 116 which is journalled in the pedestal 117 and has a handle or wheel 118 which enables the spider to be turned at will. From this construction it will be observed that as the material leaves the mandrel and is preliminarily flattened out by the bar 102 it then passes between the idler rollers 104 and is received on the wind-up shaft 105 which is driven as indicated. In order to have the material thus wind up smoothly it is necessary to have the handle 118 turned by an operator at an angular speed equal to the angular speed of the material as it is passing over and around the mandrel. As the wheel 118 is turned it will be seen that the gear connections specified will cause the shaft 105 to be turned to pull on the material and wind it up and the slip connection will permit the material also to be wound up at all times at the proper speed even though the diameter of the wind-up roll may increase. Therefore we have provided means whereby the material as it leaves the mandrel is wound up smoothly and evenly and the wind up device is turned at a synchronous angular speed and a synchronous linear speed with respect to the respective speeds of the material on the mandrel.

In a modified form of the wind-up mechanism shown in Figs. 21, 22, 23, and 24 it will be observed that the same general operation is involved except that the material is now placed under regulated tension as it is wound up. In these figures it will be noted that the material as preliminarily flattened passes over and around preliminary knurled tensioning rollers 131 and 136 passing generally under the first and over the second. The spider frame 103 is as before, generally speaking. The shaft 105 still receives the flattened material. However the construction otherwise is different and its description is as follows:

The pedestal supports journals 117 as before. In this journal is disposed a sleeve 125 to which the spider frame 103 is fixed. This sleeve at its outer end is connected to the wheel 118 so that the turning of the wheel will still turn the spider frame as before. Within the sleeve 125 is now disposed a shaft 116' which at its inner end is connected to gear 123 connected by chain 124 to gear 126 on shaft 127 journalled in suitable brackets 128 and 128' on the spider frame 103. The other end of shaft 127 has a bevel gear 129 thereon meshing with bevel gear 130 on shaft 131 journalled in the ends of the spider frame 103. The other end of shaft 131 has a pulley 132 connected by belt 133 to the pulley 106 which is connected in the above mentioned slip manner to the drive shaft 105 of the wind-up device. The shaft 131 is provided with a gear 134 meshing with a gear 135 on a shaft 136 which is mounted on a pivoted bracket member 137 freely rotatable around the shaft 131. The other end of shaft 136 is also mounted on a similar bracket 138 rotatably mounted around the other end of the shaft 131. The outer end of the shaft 136 is provided with an extension 139 adapted to ride in a slot 141 in the side of the frame of the spider 103 and has a screw handle 140 whereby the position of shaft 136 with respect to shaft 131 can be altered at will. In this modification it will be readily apparent that the idler rollers receiving the material normally are in this form positively driven and constitute the shafts 131 and 136 and can be relatively altered as to their position to vary the tension with which the material is regulated as it enters the wind-up device.

Figures 21, 22, 23, 24:
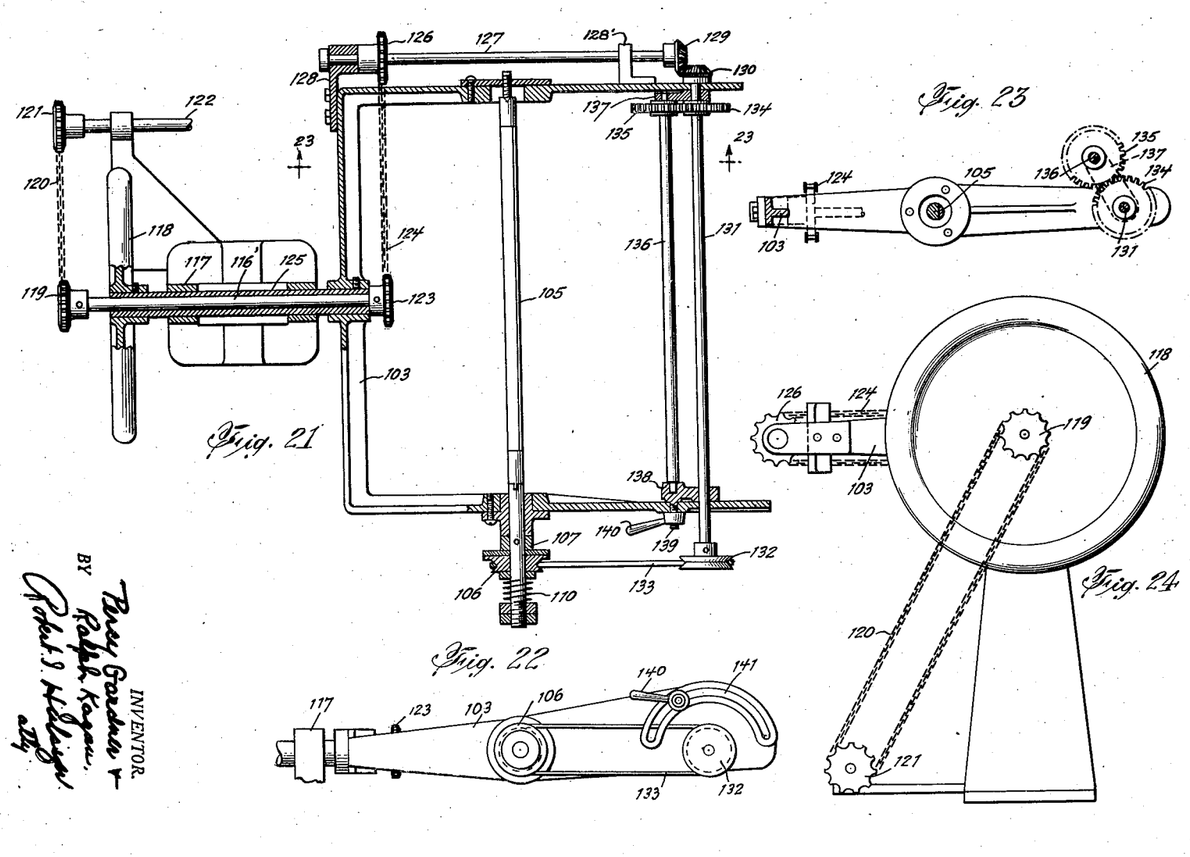
Fig. 21 is a horizontal section similar to Fig. 8 showing a modified form of material receiver or wind-up device.
Fig. 22 is a side view of a portion thereof.
Fig. 23 is a vertical section taken on the line 23—23 of Fig. 21.
Fig. 24 is an end elevation of a portion of the receiver shown in Fig. 21.

The shaft 116' is at the outer end provided with a gear 119 which is connected by chain 120 to a gear 121 on a shaft 122 which can be and is intended to be connected in any suitable and desired manner to the motor 51 so that the pull on the material linearly as it is being wound up can be synchronized with the advance of the material across and around the mandrel.

While the present preferred forms of the invention have been shown and described in detail, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What we claim is:

1. An apparatus for making spiral wound tubing from a single sheet of textile material which comprises a stationary mandrel over and around which the sheet is passed in a spiral manner with the edges of adjacent turns relatively disposed to form a flat seam, a sewing device associated with the mandrel and having a portion extending into the mandrel to a position beneath the sewing point, a group of upper feeding rollers associated with the mandrel and spaced apart therealong and engaging the upper surface of the material, a corresponding group of lower feeding rollers associated with the mandrel and similarly spaced and engaging the under surface of the material, said corresponding sets of upper and lower rollers engaging the material between them and disposed to maintain the spiral motion of the material around and along the mandrel, the first pair of upper and lower rollers being disposed on one side of the sewing point to pull the material past the sewing point and means for driving one of said groups of rollers, one of said groups of rollers being resiliently mounted and urged toward the corresponding rollers of the other group of rollers.

2. An apparatus for making spiral wound tubing from a single sheet of textile material which comprises a stationary mandrel over and around which the sheet is passed in a spiral manner with edges of adjacent turns relatively disposed to form a flat seam, a sewing device associated with the mandrel and having a portion extending into the mandrel to a position beneath the sewing point, a group of upper feeding rollers associated with the mandrel and spaced apart therealong and engaging the upper surface of the material, a corresponding group of lower feeding rollers associated with the mandrel and similarly spaced and engaging the under surface of the material, said corresponding sets of upper and lower rollers engaging the material between them and disposed to maintain the spiral motion of the material around and along the mandrel, one pair of upper and lower rollers being disposed on one side of the sewing point to pull the material past the sewing point, means for driving one of said groups of rollers, one of said groups of rollers being resiliently mounted and urged toward the corresponding rollers of the other group of rollers, said group of driven rollers and said sewing device being driven synchronously.

3. An apparatus for making spiral wound tubing from a single sheet of textile material which comprises a stationary mandrel over and around which the sheet is passed in a spiral manner with the edges of adjacent turns relatively disposed to form a flat seam, a sewing device associated with the mandrel and having a portion extending into the mandrel to a position beneath the sewing point, a group of upper feeding rollers associated with the mandrel and spaced therealong and engaging the upper surface of the material, a corresponding group of lower feeding rollers associated with the mandrel and similarly spaced and engaging the under surface of the material, said corresponding sets of upper and lower rollers engaging the material between them and disposed to maintain the spiral motion of the material around and along the mandrel, one pair of upper and lower rollers being disposed on one side of the sewing point to pull the material past the sewing point, means for driving one of said groups of rollers, one of said groups of rollers being resiliently mounted and urged toward the corresponding rollers of the other group of rollers, means rotatably supported within the tube adjacent the end of the mandrel and engaging the material to tend to flatten it out as it leaves the mandrel, a roller on which said flattened tube is wound up, a support on which said roller is mounted, said support capable of being rotated angularly in synchronism with the angular motion of the tube around the mandrel, and means associated with the support and the roller to drive the roller at a linear speed corresponding to that at which the feeding rollers advance the tube along the mandrel.

4. An apparatus for making spiral wound tubing from a single sheet of textile material which comprises a stationary mandrel over and around which the sheet is passed in a spiral manner with the edges of adjacent turns relatively disposed to form a flat seam, a sewing device associated with the mandrel and having a portion extending into the mandrel to a position beneath the sewing point, a group of upper feeding rollers associated with the mandrel and spaced therealong and engaging the upper surface of the material, a corresponding group of lower feeding rollers associated with the mandrel and similarly spaced and engaging the under surface of the material, said corresponding sets of upper and lower feeding rollers engaging the material between them and disposed to maintain the spiral motion of the material around and along the mandrel, one pair of upper and lower rollers being disposed on one side of the sewing point to pull the material past the sewing point, means for driving one of said groups of rollers, one of said groups of rollers being resiliently mounted and urged toward the corresponding rollers of the other group of rollers, and a tensioning device associated with the mandrel and engaging the material on the other side of the sewing point to subject the material to tension as it advances toward the mandrel.

5. An apparatus for making spiral wound tubing from a single sheet of textile material which comprises a stationary mandrel over and around which the sheet is passed in a spiral manner with edges of adjacent turns relatively disposed to form a flat seam, a sewing device associated with the mandrel and having a portion extending into the mandrel to a position beneath the sewing point, a group of upper feeding rollers associated with the mandrel and spaced therealong and engaging the upper surface of the material, a corresponding group of lower feeding rollers associated with the mandrel and similarly spaced and engaging the under surface of the material, said corresponding sets of upper and lower rollers engaging the material between them and disposed to maintain the spiral motion of the material around and along the mandrel, one pair of upper and lower rollers being disposed on one side of the sewing point to pull the material past the sewing point, means for driving one of said groups of rollers, one of said groups of rollers being resiliently mounted and urged toward the corresponding rollers of the other group of rollers, a tensioning device associated with the mandrel and engaging the material on the other side of the sewing point to subject the material to tension as it advances toward the mandrel, said group of driven rollers and the sewing device being driven synchronously.

6. An apparatus for making spiral wound tubing from a single sheet of textile material which comprises a stationary mandrel over and around which the sheet is passed in a spiral manner with edges of adjacent turns relatively disposed to form a flat seam, a sewing device associated with the mandrel and having a portion extending into the mandrel to a position beneath the sewing point, a group of upper feeding rollers associated with the mandrel and spaced therealong and engaging the upper surface of the material, a corresponding group of lower feeding rollers associated with the mandrel and similarly spaced and engaging the under surface of the material, said corresponding sets of upper and lower rollers engaging the material between them and disposed to maintain the spiral motion of the material around and along the mandrel, one pair of upper and lower rollers being disposed on one side of the sewing point to pull the material past the sewing point, means for driving one of said groups of rollers, one of said groups of rollers being resiliently mounted and urged toward the corresponding rollers of the other group of rollers, a tensioning device associated with the mandrel and engaging the material on the other side of the sewing point to subject the material to tension as it advances toward the mandrel, means rotatably supported within the tube adjacent the end of the mandrel and engaging the material to tend to flatten it out as it leaves the mandrel, a roller on which said flattened tube is wound up, a support on which said roller is mounted, said support capable of being rotated angularly in synchronism with the angular motion of the tube around the mandrel, and means associated with the support and the roller to drive the roller at a linear speed corresponding to that at which the feeding rollers advance the tube along the mandrel.

7. An apparatus for forming tubes having a source of supply and a stationary mandrel, which comprises a plurality of feeding means associated with the mandrel and engaging the material thereon and pulling the material substantially directly from the supply on to and around the mandrel at a constant spiral angle with opposite edges of the material relatively disposed to form a flat seam, and means for securing said edges together to form a continuous tube, the first of said feeding means disposed immediately behind the securing means along the junction line of the adjacent edges and pulling the material past the securing means, said feeding means constituting the sole feeding means for pulling the material on to and around the mandrel.

8. An apparatus for forming tubes having a source of supply and a stationary mandrel, which comprises a plurality of positive feeding means engaging the upper and lower surfaces of the material and associated with the mandrel and pulling the material substantially directly from the supply on to and around the mandrel at a constant spiral angle with opposite edges of the material relatively disposed to form a flat seam, and means for securing said edges together to form a continuous tube, said feeding means constituting the sole feeding means for pulling the material on to and around the mandrel.

9. An apparatus for forming tubes having a source of supply and a stationary mandrel, which comprises a plurality of positive feeding means engaging the material on its upper and lower surfaces and associated with the mandrel and pulling the material substantially directly from the supply on to and around the mandrel at a constant spiral angle with opposite edges of the material relatively disposed to form a flat seam, means for securing said edges together to form a continuous tube, the first of said feeding means disposed immediately behind the securing means along the junction line of the adjacent edges and pulling the material past the securing means, said feeding means constituting the sole feeding means for pulling the material on to and around the mandrel.

10. An apparatus for forming tubes having a source of supply and a stationary mandrel, which comprises a plurality of feeding means associated with the mandrel and engaging the material thereon and pulling the material substantially directly from the supply on to and around the mandrel at a constant spiral angle with opposite edges of the material relatively disposed to form a flat seam, a sewing device with a needle for sewing the edges together to form a continuous tube, the first of said feeding means disposed immediately behind the needle along the sewn seam line and pulling the material past the needle, said feeding means constituting the sole feeding means for pulling the material on to and around the mandrel.

11. An apparatus for forming tubes having a source of supply and a stationary mandrel, which comprises a plurality of positive feeding means engaging the upper and lower surfaces of the material and associated with the mandrel and pulling the material substantially directly from the supply on to and around the mandrel at a constant spiral angle with opposite edges of the material relatively disposed to form a flat seam, and sewing means having a needle for sewing the edges together to form a continuous tube, said feeding means constituting the sole feeding means for pulling the material on to and around the mandrel.

12. An apparatus for forming tubes having a source of supply and a stationary mandrel, which comprises a plurality of positive feeding means engaging the material on its upper and lower surfaces and associated with the mandrel and pulling the material substantially directly from the supply on to and around the mandrel at a constant spiral angle with opposite edges of the material relatively disposed to form a flat seam, means including a needle for sewing said edges together to form a continuous tube, the first of said feeding means disposed immediately behind the needle along the sewn seam line to pull the material off the source and past the needle, said feeding means constituting the sole feeding means for pulling the material on to and around the mandrel.

13. In an apparatus for forming tubes, a source of strip material supply, a mandrel, stitching means, and means positioned immediately to the rear of said stitching means for drawing the strip material past said stitching means and spirally on to said mandrel.

14. An apparatus as in claim 13, in which the drawing means engages the strip material from above and below to move the same.

15. In an apparatus for forming tubes, a source of strip material supply, a mandrel, stitching means, and feed rollers positioned immediately to the rear of said stitching means for drawing the strip material past said stitching means and spirally onto said mandrel.

16. An apparatus as in claim 15, in which the rollers engage the strip material from above and below to move the same.

17. In an apparatus for forming tubes, a source of strip material supply, a mandrel, stitching means, and means comprising a plurality of rollers positioned immediately to the rear of said stitching means for drawing the strip material past said stitching means and spirally onto said mandrel.

18. In an apparatus for forming tubes, a source of strip material supply, a mandrel, stitching means, and feeding means engaging the upper and lower surfaces of the material for positively driving the same and positioned to the rear of said stitching means and constituting the sole means for drawing the strip material past said stitching means and spirally onto said mandrel.

19. In an apparatus for forming tubes, a source of strip material supply, a mandrel, stitching means, and feed rollers positioned immediately to the rear of said stitching means for drawing the strip material past said stitching means and spirally onto said mandrel, said rollers located at an angle to the mandrel.

20. In an apparatus for forming tubes, a source of strip material supply, a mandrel, stitching means for stitching opposite edges together to form a spiral tube, and feed rollers positioned immediately to the rear of said stitching means for drawing the strip material past the stitching means and spirally onto said mandrel.

21. An apparatus as in claim 15 in which the stitching means joins the material at the first meeting point of the opposite edges.

PERCY GARDNER.
RALPH KAGAN.